United States Patent [19]
Yoon

[11] Patent Number: 5,563,475
[45] Date of Patent: Oct. 8, 1996

[54] HIGH VOLTAGE DISCHARGE LAMP DRIVING DEVICE

[75] Inventor: Jeong-whan Yoon, Seoul, Rep. of Korea

[73] Assignee: Samsung Display Devices Co., Ltd., Kyunggi-do, Rep. of Korea

[21] Appl. No.: 255,384

[22] Filed: Jun. 8, 1994

[30] Foreign Application Priority Data

Jun. 21, 1993 [KR] Rep. of Korea ............... 93-11334

[51] Int. Cl.$^6$ ............................................. H05B 37/02
[52] U.S. Cl. .................. 315/289; 315/205; 315/DIG. 7; 315/360; 315/291
[58] Field of Search .......................... 315/289, 158, 315/159, 360, 209 T, 224, 176, 208, DIG. 5, 205, DIG. 7, 291

[56] References Cited

U.S. PATENT DOCUMENTS

| | | | |
|---|---|---|---|
| 4,170,747 | 10/1979 | Holmes | 315/307 |
| 4,358,716 | 11/1982 | Cordes et al. | 315/306 |
| 4,392,086 | 7/1983 | Ide et al. | 315/174 |
| 4,523,128 | 6/1985 | Stamm et al. | 315/291 |
| 4,613,795 | 9/1986 | Itani et al. | 315/205 |
| 4,663,570 | 5/1987 | Luchaco et al. | 315/219 |
| 4,677,346 | 6/1987 | Roberts et al. | 315/226 |
| 4,910,440 | 3/1990 | McMullin | 315/307 |
| 4,924,150 | 5/1990 | Nilssen | 315/244 |
| 5,142,544 | 8/1992 | Donahue et al. | 315/307 X |
| 5,225,742 | 7/1993 | Beasley | 315/307 |
| 5,233,273 | 8/1993 | Waki et al. | 315/224 |
| 5,428,267 | 6/1995 | Peil | 315/224 |

FOREIGN PATENT DOCUMENTS

| | | | |
|---|---|---|---|
| 5-121179 | 5/1993 | Japan | 315/360 |
| WO8910047 | 10/1989 | WIPO | 315/209 T |

*Primary Examiner*—Robert Pascal
*Assistant Examiner*—Arnold Kinkead
*Attorney, Agent, or Firm*—Christie, Parker & Hale, LLP

[57] ABSTRACT

A high voltage discharge lamp driving device which can be used for an outdoor high voltage discharge lamp driving device due to reduce discharge start voltage of the high voltage discharge lamp by changing a turns ratio of a last output coil. The high voltage discharge lamp driving device which can light the high voltage discharge lamp in an instant by outputting over tens of thousands volt discharge start voltage, and can raise power efficiency by generating high voltage pulse signals for driving the high voltage discharge lamp and by shortening the time the high voltage pulses are applied to the high voltage discharge lamp.

3 Claims, 5 Drawing Sheets

HIGH VOLTAGE DISCHARGE LAMP DRIVING DEVICE

BACKGROUND OF THE INVENTION (1) Field of the Invention

The present invention relates to a high voltage discharge lamp driving device, more particularly, to such a device which can be used for an outdoor high voltage discharge lamp driving device due to reducing discharge start voltage of the high voltage discharge lamp by changing a turns ratio of a last output coil. This invention also relates to the high voltage discharge lamp driving device which can light the high voltage discharge lamp HID in an instant by outputting over tens of thousands of volt discharge start voltage, and which can raise an efficiency of power by generating high voltage pulses for driving the high voltage discharge lamp and by shortening the periods of high voltage pulse applied to the high voltage discharge lamp.

(2) Description of the Related Art

A high voltage discharge lamp, such as a metal-haloid lamp, is generally used for outdoor lighting or factorial lighting, but this is minimized to be used in indoor lighting, such as in a store having a low ceiling.

To light up this high voltage discharge lamp, thousands to tens of thousands of volt discharge start voltage is needed. So discharge lamp driving device is needed to get this discharge start voltage from hundreds of common power volt.

A technique for driving a conventional high voltage discharge lamp is disclosed in Korean Patent Application Publication No. 91-3551 (Publication Date: Jun. 4, 1991), entitled "Electronic Stabilizer for High Voltage Discharge Lamp".

A stabilizer which plays an important role in a driving device has an electronic device instead of a transformer in the publication "Electronic Stabilizer for High Voltage Discharge Lamp". So the size and the weight of the stabilizer are minimized. At the same time, the loss of power is reduced and the production cost can be lower.

But the "Electronic Stabilizer for High Voltage Discharge Lamp" in conventional art, has less than thousands of volt output voltage as discharge start voltage. After the high voltage discharge lamp is turned ON and OFF, a user has to wait for several minutes when he turns ON the high voltage discharge lamp again. So there is a disadvantage in indoor lighting in the case where the high voltage discharge lamp is frequently turned ON and OFF.

SUMMARY OF THE INVENTION

Therefore, a primary object of the invention is to provide a high voltage discharge lamp driving device which can light the high voltage discharge lamp in an instant.

Another object of the invention is to provide the high voltage discharge lamp driving device which can raise the efficiency of power by generating a high voltage pulses for driving the high voltage discharge lamp and by shortening the periods of high voltage pulse applied to the high voltage discharge lamp.

And the third object of the invention is to provide the high voltage discharge lamp driving device which can be used for an outdoor high voltage discharge lamp driving device due to reduce the discharge start voltage of the high voltage discharge lamp by changing a turns ratio of a last output coil.

This high voltage discharge lamp driving device comprises: first and second power supplies for converting common alternating current AC voltage into direct current DC voltage and outputting;

a gate driver for outputting first and second gate signals having the same phase, outputting third and fourth gate signals having the same phase and a reverse phase with the first and second gate signals;

an inverter for generating a positive pulse at a first output if the first and second gate signals are input from the gate driver and generating a positive pulse at a second output if the third and fourth gate signals are input from the gate driver in order and outputting by using DC voltage output from the first power supply; and a light circuit block for multiplying more than tens of thousands of volts of the pulsed input from the inverter.

DESCRIPTION OF THE PREFERRED EMBODIMENTS

In connection with an embodiment shown in FIGS. 1 through 5, the present invention will be described as follows.

Figure 1:
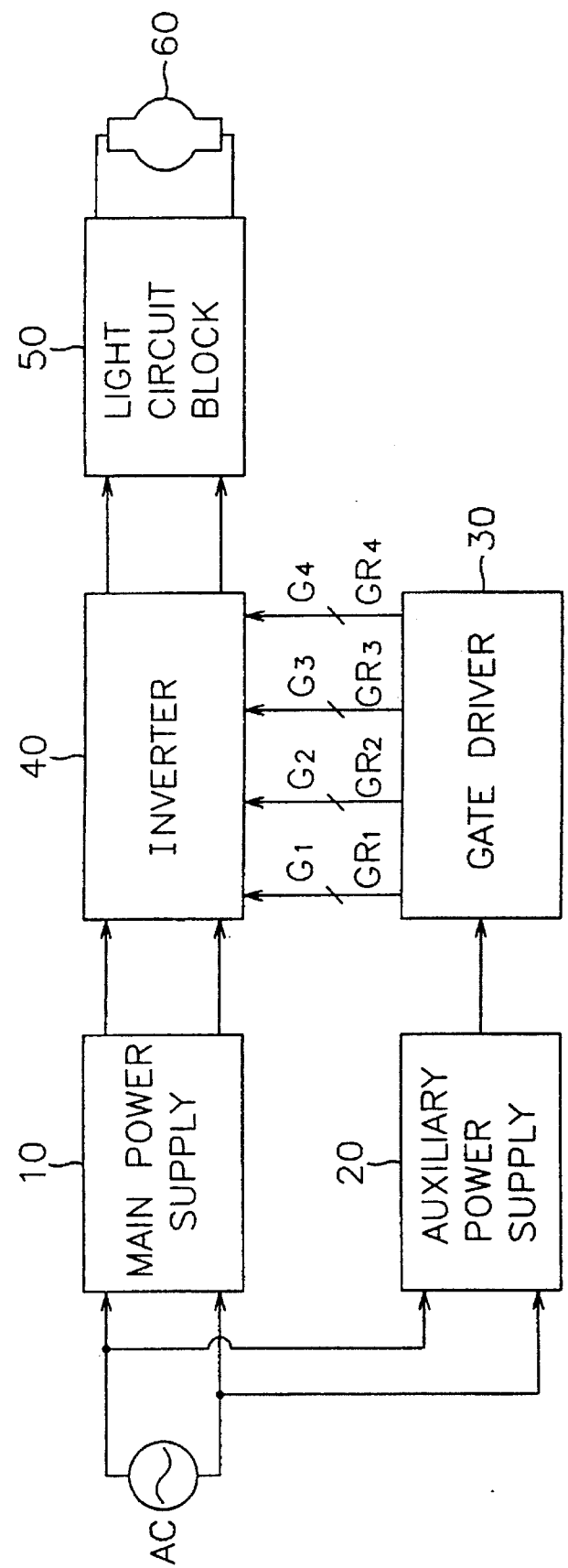
FIG. 1 is a block diagram illustrating a high voltage discharge driving device according to the embodiment of the present invention.

FIG. 1 is a block diagram illustrating a high voltage discharge driving device according to the embodiment of the present invention.

Referring to FIG. 1, the high voltage discharge driving device includes a main power supply 10 with an input terminal thereof connected to alternating current AC voltage; an auxiliary power supply 20 with an input terminal thereof connected to AC voltage; a gate driver 30 with an input terminal thereof connected to an output terminal the auxiliary supply 20; an inverter 40 with an input terminal thereof connected to output terminals of the main power supply 10 and the gate driver 30; a light circuit block 50 with an input terminal connected to an output terminal of the inverter 40; and a high voltage discharge lamp 60 with an input terminal connected to an output terminal of the light circuit block 50.

Figure 2:
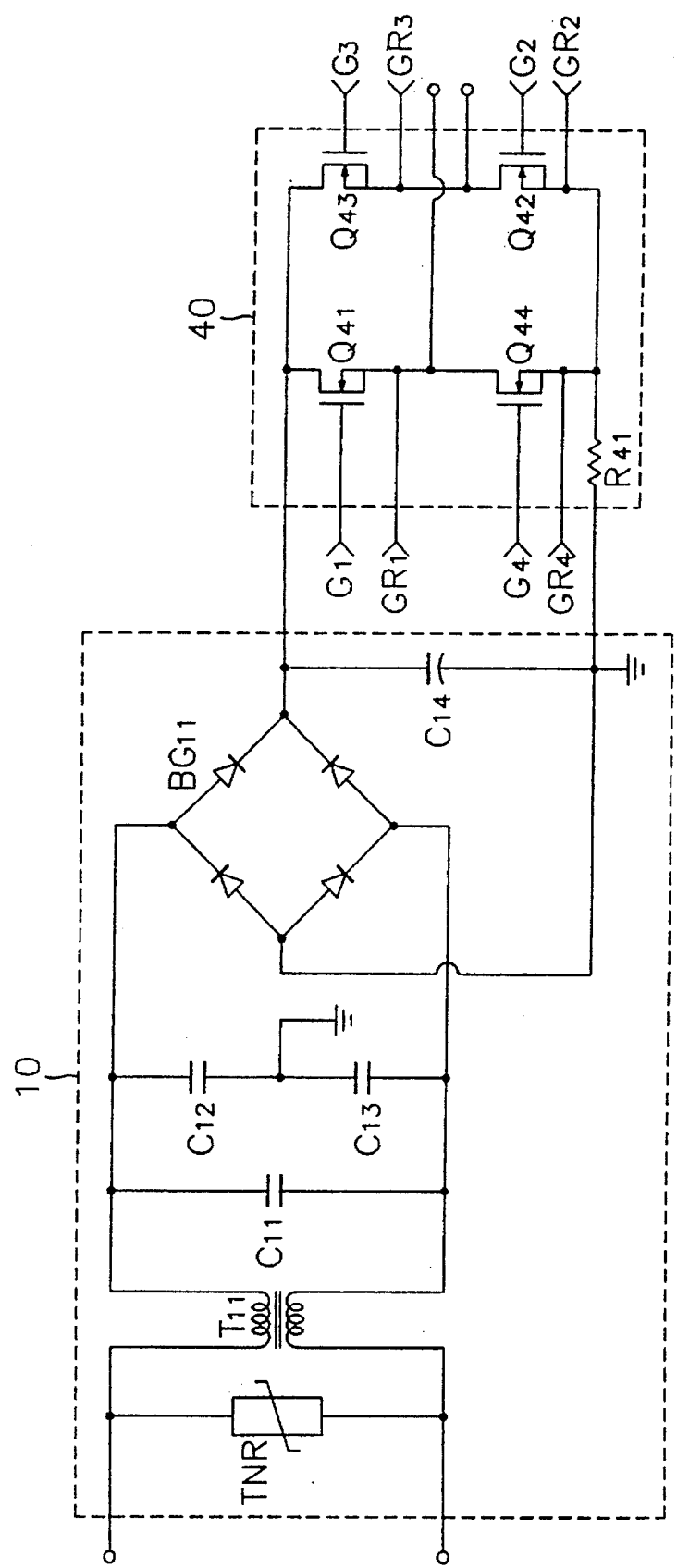
FIG. 2 is a detailed circuit diagram illustrating a main power supply and an inverter of the high voltage discharge driving device according to the embodiment of the present invention.

FIG. 2 is a detailed circuit diagram illustrating the main power supply and the inverter of the high voltage discharge driving device according to the embodiment of the present invention.

Referring to FIG. 2, the main power supply 10 of the high voltage discharge lamp driving device according to the embodiment of the present invention includes an overcurrent protective element TNR connected to AC voltage in parallel; a filter T11 with an input terminal thereof connected to AC voltage; a capacitor C11 connected between output terminals of the filter T11; a capacitor C12 connected to one terminal of the capacitor C11 and to ground; a capacitor C13 connected to the other terminal of the capacitor C11 and to ground; a rectifier BG11 with an input terminal thereof connected to both terminals of the capacitor C11; and a smoothing capacitor C14 connected to an output terminal of the rectifier BG11 and to ground.

Also referring to FIG. 2, the inverter 40 of the high voltage discharge lamp driving device according to the embodiment of the present invention includes first and third field effect transistors Q41, Q43 with a drain terminal thereof connected to an output terminal of the main power supply 10, and with gate terminals thereof respectively connected to output signal lines G1, G3 of the gate driver 30; second and fourth field effect transistors Q42, Q44 with source terminals thereof connected to the drain terminals of the first and third field effect transistors Q41, Q43 respectively, with the gate terminals thereof connected to the output signal lines G2, G4 of the gate driver 30 respectively, and with drain terminals thereof connected to each other; and a resistor R41 connected to a drain connection node of the second and fourth field effect transistors Q42, Q44 and connected to ground.

Figure 3:
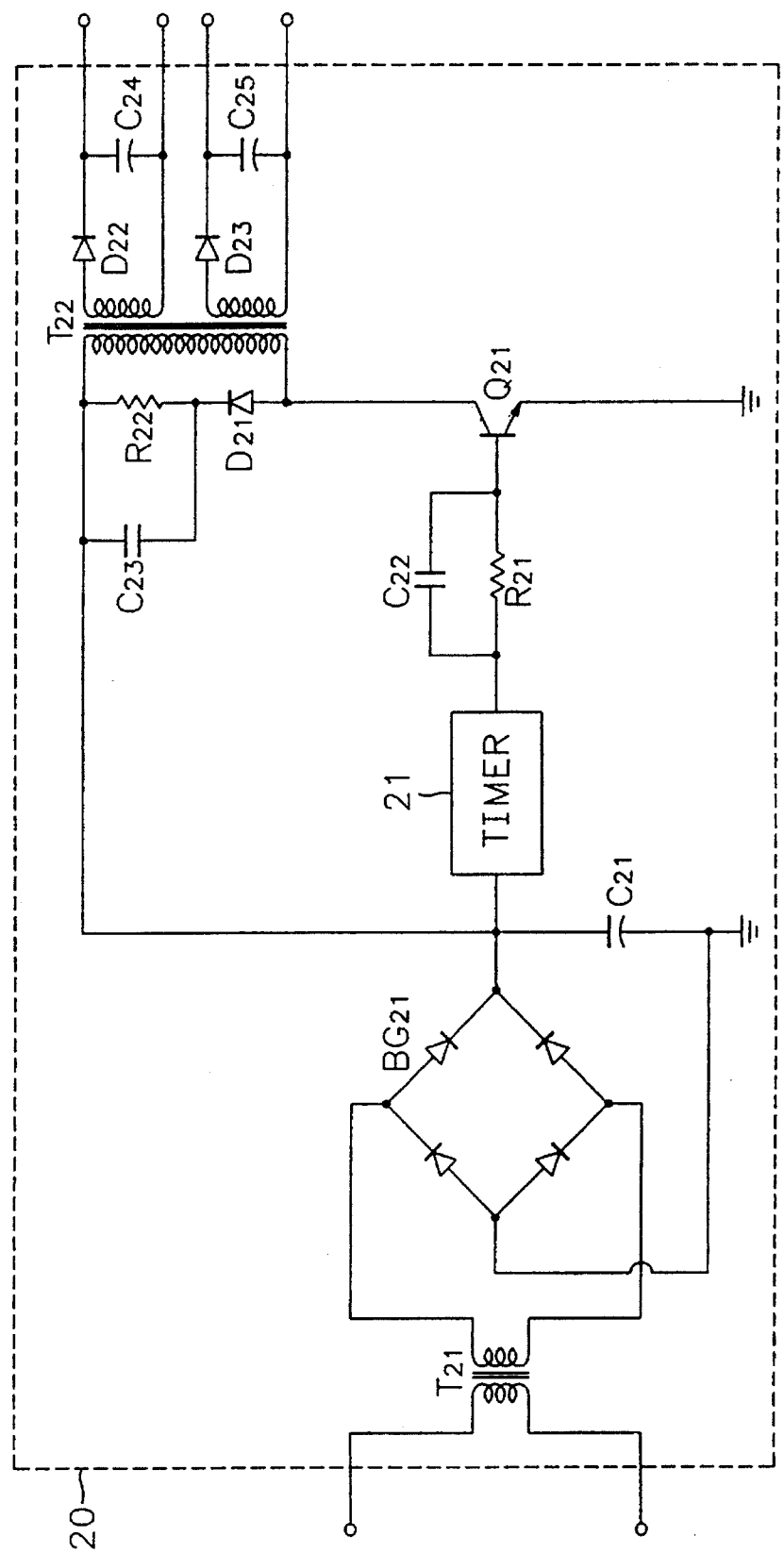
FIG. 3 is a detailed circuit diagram illustrating an auxiliary power supply of the high voltage discharge driving device according to the embodiment of the present invention.

FIG. 3 is a detailed circuit diagram illustrating the auxiliary power supply of the high voltage discharge driving device according to the embodiment of the present invention.

Referring to FIG. 3, the auxiliary power supply 20 of the high voltage discharge lamp driving device according to the embodiment of the present invention includes a transformer T21 with a primary coil thereof connected to AC voltage; a rectifier BG21 with an input terminal thereof connected to a secondary coil of the transformer T21; a capacitor C21 connected to an output terminal of the rectifier BG21 and connected to ground; a timer 21 with an electric input terminal thereof connected to the output terminal of the rectifier BG21; a resistor R21 and a capacitor C22 with each one terminal thereof connected to an output terminal of the timer 21, and with the other terminals thereof connected to each other; a transistor Q21 with a base terminal thereof connected to a connection node of the resistor R21 and the capacitor C22, and with an emitter terminal thereof connected to ground; a resistor R22 and a capacitor C23 with each one terminal thereof connected to an output terminal of the rectifier BG21, and with the other terminals thereof connected to each other; a diode D21 with an anode terminal thereof connected to a connection node of the resistor R22 and the capacitor C23, and with a cathode terminal thereof connected to a collector terminal of the transistor Q21; a transformer T22 with a primary coil thereof connected between the output terminal of the rectifier BG21 and the collector terminal of the transistor Q21; rectifying diodes D22, D23 with each anode terminal thereof connected to a secondary coil of the transformer T22; and smoothing capacitors C24, C25 connected to each cathode terminal of the rectifying diode D22, D23 and connected to ground.

Figure 4:
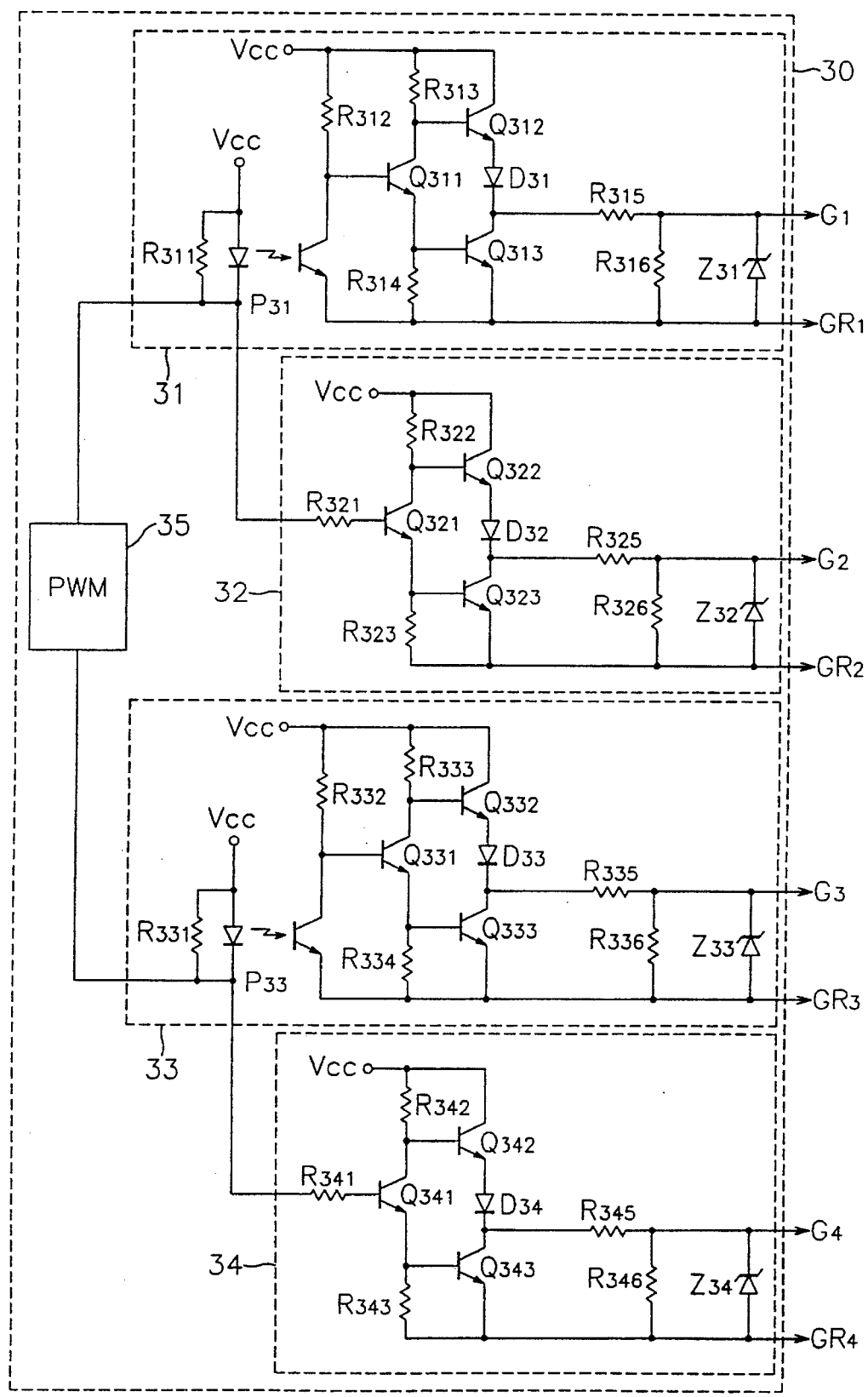
FIG. 4 is a detailed circuit diagram illustrating a gate driver of the high voltage discharge driving device according to the embodiment of the present invention.

FIG. 4 is a detailed circuit diagram illustrating the gate driver of the high voltage discharge driving device according to the embodiment of the present invention.

Referring to FIG. 4, the gate driver 30 of the high voltage discharge lamp driving device according to the embodiment of the present invention comprises a pulse-duration modulation signal generator 35; first and second gate signal generators 31, 32 with each input terminal thereof connected to an output terminal of the pulse-duration modulation signal generator 35; and third and fourth gate signal generators 33, 34 with each input terminal thereof connected to a reverse output terminal of the pulse-duration modulation signal generator 35.

The first gate signal generator 31 includes a photocoupler P31 with a cathode terminal of an emitting diode thereof connected to the output terminal of the pulse-duration modulation signal generator 35, and with an anode terminal of the emitting diode thereof connected to power voltage Vcc; a resistor R311 connected between the cathode terminal and the anode terminal of the emitting diode of the photocoupler P31; a resistor R312 connected to a collector terminal of a receiving transistor of the photocoupler P31 and connected to the power voltage Vcc; a resistor R313 with one terminal thereof connected to the power voltage Vcc; a transistor Q311 with a collector terminal thereof connected to the other terminal of the resistor R313, and with a base terminal thereof connected to the collector terminal of the receiving transistor of the photocoupler P31; a resistor R314 connected between an emitter terminal of the transistor Q311 and a signal line GR1; a transistor Q312 with a collector terminal thereof connected to the power voltage Vcc, and with a base terminal thereof connected to the collector terminal of the transistor Q311; a diode D31 with an anode terminal thereof connected to an emitter terminal of the transistor Q312; a transistor Q313 with a collector terminal thereof connected to a cathode terminal of the diode D31, with a base terminal thereof connected to the emitter terminal of the transistor Q311, and with an emitter terminal thereof connected to the signal line GR1; a resistor R315 with one terminal thereof connected to the collector terminal of the transistor Q313; and a resistor R316 and a zener diode Z31 connected the other terminal of the resistor R315 and the signal line GR1 in parallel.

Additionally, the second gate signal generator 32 includes a resistor R321 with one terminal thereof connected to the output terminal of the pulse-duration modulation signal generator 35; a transistor Q321 with a base terminal thereof connected to the other terminal of the transistor Q321; a resistor R322 connected between a collector terminal of the transistor Q321 and the power voltage Vcc; a resistor R323 connected between an emitter terminal of the transistor Q321 and a signal line GR2; a transistor Q322 with a base terminal thereof connected to a collector terminal of the transistor Q321, and with a collector terminal connected to the power voltage Vcc; a diode D32 with an anode terminal thereof connected to an emitter terminal of the transistor Q322; a transistor Q323 with a collector terminal thereof connected to a cathode terminal of the diode D32, with a base terminal thereof connected to an emitter terminal of the transistor Q321, and with an emitter terminal thereof connected to the signal line GR2; a resistor R325 with one terminal thereof connected to the collector terminal of the transistor Q323; and a resistor R326 and a zener diode Z32 connected between the other terminal of the resistor R325 and the signal line GR2 in parallel.

The third gate signal generator 33 includes a photocoupler P33 with a cathode terminal of an emitting diode thereof connected to the output terminal of the pulse-duration modulation signal generator 35, and with an anode terminal of the emitting diode thereof connected to power voltage Vcc; a resistor R331 connected between the cathode terminal and the anode terminal of the emitting diode of the photocoupler P33; a resistor R332 connected to a collector terminal of a receiving transistor of the photocoupler P33 and connected to the power voltage Vcc; a resistor R333 with one terminal thereof connected to the power voltage Vcc; a transistor Q331 with a collector terminal thereof connected to the other terminal of the resistor R333, and with a base terminal thereof connected to the collector terminal of the receiving transistor of the photocoupler P33; a resistor R334 connected between an emitter terminal of the transistor Q331 and a signal line GR3; a transistor Q332 with a collector terminal thereof connected to the power voltage Vcc, and with a base terminal thereof connected to the collector terminal of the transistor Q331; a diode D33 with an anode terminal thereof connected to an emitter terminal of the transistor Q312; a transistor Q333 with a collector terminal thereof connected to a cathode terminal of the diode D33, with a base terminal thereof connected to the emitter terminal of the transistor Q331, and with an emitter terminal thereof connected to the signal line GR3; a resistor R335 with one terminal thereof connected to the collector terminal of the transistor Q333; and a resistor R336 and a zener diode Z33 connected to the other terminal of the resistor R335 and the signal line GR3 in parallel.

Additionally, the fourth gate signal generator 34 includes a resistor R341 with one terminal thereof connected to the output terminal of the pulse-duration modulation signal generator 35; a transistor Q341 with a base terminal thereof connected to the other terminal of the transistor Q341; a resistor R342 connected between a collector terminal of the transistor Q341 and the power voltage Vcc; a resistor R343 connected between an emitter terminal of the transistor Q341 and a signal line GR4; a transistor Q342 with a base terminal thereof connected to a collector terminal of the transistor Q341, and with a collector terminal connected to the power voltage Vcc; a diode D34 with an anode terminal thereof connected to an emitter terminal of the transistor Q342; a transistor Q343 with a collector terminal thereof connected to a cathode terminal of the diode D34, with a base terminal thereof connected to an emitter terminal of the transistor Q341, and with an emitter terminal thereof connected to the signal line GR4; a resistor R345 with one terminal thereof connected to the collector terminal of the transistor Q343; and a resistor R346 and a zener diode Z34 connected between the other terminal of the resistor R345 and the signal line GR4 in parallel.

Figure 5:
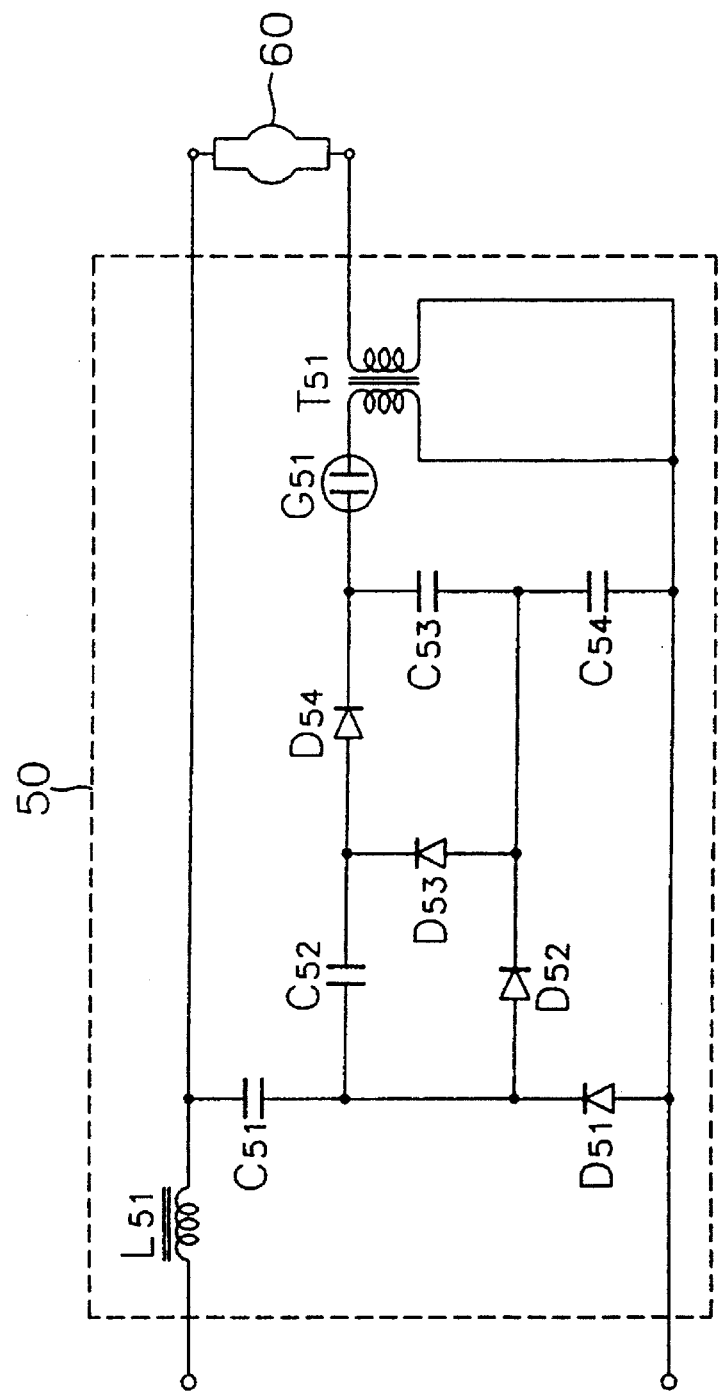
FIG. 5 is a detailed circuit diagram illustrating a light circuit block of the high voltage discharge driving device according to the embodiment of the present invention.

FIG. 5 is a detailed circuit diagram illustrating the light circuit block of the high voltage discharge driving device according to the embodiment of the present invention.

Referring to FIG. 5, the light circuit block 50 of the high voltage discharge lamp driving device according to the embodiment of the present invention comprises a coil L51 with one terminal thereof connected to an output terminal of the inverter 40; a capacitor C51 with one terminal thereof connected to the other terminal of the coil L51; a diode D52 with an anode terminal thereof connected to the other terminal of the capacitor C51; a diode D53 with an anode terminal thereof connected to a cathode terminal of the diode D52; a capacitor C52 connected between an anode terminal of the diode D51 and a cathode terminal of the diode D53; a diode D51 with a cathode terminal thereof connected to the anode terminal of the diode D52, and with the anode terminal thereof connected to the output terminal of the inverter 40; a diode D54 with an anode terminal thereof connected to the cathode terminal of the diode D53; a capacitor C53 connected between the anode terminal of the diode D53 and a cathode terminal of the diode D54; a capacitor C54 connected between the anode terminal of the diode D53 and the anode terminal of the diode D51; a discharge tube G51 with one terminal thereof connected to the cathode terminal of the diode D54; and a transformer with a primary coil thereof connected between the other terminal of the discharge tube G51 and the output terminal of the inverter 40.

The operation of the high voltage discharge lamp driving device in accordance with the embodiment of the present invention as described above is as follows.

In the case where a user turns ON the high voltage discharge lamp 60, if AC voltage is applied to the high voltage discharge lamp driving device according to the embodiment of the present invention, the high voltage discharge lamp driving device starts to operate.

AC voltage which is applied to the main power supply 10 is applied to the rectifier BG11 after AC voltage passes through the filter T11 and capacitors C11, C12, C13 and the noise is removed. After full-wave rectification by the rectifier BG11, AC voltage is smoothed by the smoothing capacitor C14 and output to the inverter 40 after being converted into DC voltage.

Additionally, AC voltage which is applied to the auxiliary power supply 20 is applied to the rectifier BG21 after converting by the transformer T21. After full-wave rectification by the rectifier BG21, this AC voltage is smoothed by the smoothing capacitor C21 and converted into DC voltage.

DC voltage output from the rectifier BG21 is applied to operate the timer 21. After the timer 21 is operated, the transistor Q21 is repeatedly turned ON/OFF by the pulse signal output from the timer 21. A NE555 chip is used as the timer 21 in the preferred embodiment of the present invention, but other functionally equivalent chips may also be used.

After the transistor Q21 of the auxiliary power supply 20 is repeatedly turned ON/OFF, output voltage of the rectifier BG21 is applied to the rectifying diodes D22, D23 by the transformer T22. This output voltage is rectified and smoothed by the rectifying diodes D22, D23, and the smoothing capacitors C24, C25. Then output voltage is converted into constant DC voltage and output to the gate driver 30.

DC voltage output from the auxiliary power supply 20 is applied to the gate driver 30 as power voltage Vcc, power is applied to the pulse-duration modulation signal generator 35 of the gate driver 30 and the first, second, third and fourth gate signal generators 31, 32, 33, 34. The gate driver 30 starts to operate.

The pulse-duration modulation signal generator 35 of the gate driver 30 outputs the pulse signal having a constant frequency for operating the high voltage discharge lamp to the first and second gate signal generators 31, 32. At the same time, the pulse-duration modulation signal generator 35 outputs the pulse signal having a reverse phase to the third and fourth gate signal generators 33, 34. Namely, if a high pulse signal is output to the first and second gate signal generators 31, 32, a low pulse signal is output to the third and fourth gate signal generators 33, 34. On the contrary, if the low signal is output to the first and second gate signal generators 31, 32, the high pulse signal is output to the third and fourth gate signal generators 33, 34. Therefore, the first and second gate signal generators 31, 32 are complementarily operated with the third and fourth gate signal generators 33, 34.

If the low pulse signal is input from the pulse-duration modulation signal generator 35 to the first gate signal generator 31, the photocoupler P31 of the first gate signal generator 31 is operated. Then the transistors Q311, Q313 are turned OFF and, at the same time, the transistor Q312 is turned ON. If the transistor Q312 is turned ON, power voltage Vcc through the transistor Q312 and the diode D31 is divided by the resistors R315, R316. Power voltage which is applied to the resistor R316 is kept at a high level constantly by the zener diode Z31 and output to the inverter 40 as a first gate signal G1.

If the high pulse signal is input from the pulse-duration modulation signal generator 35 to the first gate signal generator 31, the photocoupler P31 of the first gate signal generator 31 is not operated and the transistors Q311, Q313 are turned ON. If the transistor Q313 is turned ON, the voltage which is applied to the resistor R316 is dropped. Therefore, the first gate signal G1 having a low level is output to the inverter 40.

If the low pulse signal is input from the pulse-duration modulation signal generator 35 to the second gate signal generator 32, the transistors Q321, Q323 of the second gate signal generator 32 are turned OFF and, at the same time, the transistor Q322 is turned ON. If the transistor Q322 is turned ON, power voltage Vcc through the transistor Q322 and the diode D32 is divided by the resistors R325, R326. Power voltage which is applied to the resistor R326 is kept at a high level constantly by the zener diode Z32 and output to the inverter 40 as a second gate signal G2.

If the high pulse signal is input from the pulse-duration modulation signal generator 35 to the second gate signal generator 32, the transistors Q321, Q323 are turned ON. If the transistor Q323 is turned ON, the voltage which is applied to the resistor R326 is dropped. Therefore, the second gate signal G2 having a low level is output to the inverter 40.

If the low pulse signal is input from the pulse-duration modulation signal generator 35 to the third gate signal generator 33, the photocoupler P33 of the third gate signal generator 33 is operated. Then the transistors Q331, Q333 are turned OFF and, at the same time, the transistor Q332 is turned ON. If the transistor Q332 is turned ON, power voltage Vcc through the transistor Q332 and the diode D33 is divided by the resistors R335, R336. Power voltage which is applied to the resistor R336 is kept at a high level constantly by the zener diode Z33 and output to the inverter 40 as a third gate signal G3.

If the high pulse signal is input from the pulse-duration modulation signal generator 35 to the third gate signal generator 33, the photocoupler P33 of the third gate signal generator 33 is not operated and the transistors Q331, Q333 are turned ON. If the transistor Q333 is turned ON, the voltage which is applied to the resistor R336 is dropped. Therefore, the third gate signal G3 having a low level is output to the inverter 40.

If the low pulse signal is input from the pulse-duration modulation signal generator 35 to the fourth gate signal generator 34, the transistors Q341, Q343 of the fourth gate signal generator 34 are turned OFF and, at the same time, the transistor Q342 is turned ON. If the transistor Q342 is turned ON, power voltage Vcc through the transistor Q342 and the diode D34 is divided by the resistors R345, R346. Power voltage which is applied to the resistor R346 is kept at a high level constantly by the zener diode Z34 and output to the inverter 40 as a fourth gate signal G4.

If the high pulse signal is input from the pulse-duration modulation signal generator 35 to the fourth gate signal generator 34, the transistors Q341, Q343 are turned ON. If the transistor Q343 is turned ON, the voltage which is applied to the resistor R346 is dropped. Therefore, the fourth gate signal G4 having a low level is output to the inverter 40.

If the high pulse signal is output from the pulse-duration modulation signal generator 35 to the first and second gate signal generators 31, 32, the first and second gate signals G1, G2 having a low level are generated from the first and second gate signal generators 31, 32 and output to the inverter 40. At the same time, if the low pulse signal is output from the pulse-duration modulation signal generator 35 to the third and fourth gate signal generators 33, 34, the third and fourth gate signals G3, G4 having a high level are generated from the third and fourth gate signal generators 33, 34 and output to the inverter 40.

Additionally, if the low pulse signal is output from the pulse-duration modulation signal generator 35 to the first and second gate signal generators 31, 32, the first and second gate signals G1, G2 having a high level are generated from the first and second gate signal generators 31, 32 and output to the inverter 40. At the same time, if the high pulse signal is output from the pulse-duration modulation signal generator 35 to the third and fourth gate signal generators 33, 34, the third and fourth gate signals G3, G4 having a low level are generated from the third and fourth gate signal generators 33, 34 and output to the inverter 40.

From the gate driver 30, the first and second gate signals G1, G2 having the high level and the third and fourth gate signals G3, G4 having the low level are input to the inverter 40, the first and second field effect transistors Q41, Q42 of the inverter 40 are turned ON and the third and fourth field effect transistors Q43, Q44 are turned OFF. If the first and second field effect transistors Q41, Q42 are turned ON, a positive pulse at a first output having hundreds of volt peak value is applied to the light circuit block 50.

On the contrary, from the gate driver 30, if the first and second gate signals G1, G2 having the low level and the third and fourth gate signals G3, G4 having the high level are input to the inverter 40, then the first and second field effect transistors Q41, Q42 of the inverter 40 are turned OFF and the third and fourth field effect transistors Q43, Q44 are turned ON. If the third and fourth field effect transistors Q43, Q44 are turned ON, a positive pulse at a second output having hundreds of volt peak value is applied to the light circuit block 50.

The light circuit block 50 multiplies the positive pulse voltages at the first and second outputs from the inverter 40 and then applies these voltage signals to turn ON the high voltage discharge lamp.

The pulse signal having hundreds of volt peak value input from the inverter 40 to the light circuit block passes through the coil L51 of a cold current element and the noise is removed. Then this pulse signal is applied to the discharge tube G51 after being primarily multiplied by a multiplying circuit having the capacitors C51, C52, C53, C54 and the diodes D51, D52, D53, D54. If the voltage more than a predetermined voltage is applied to the discharge tube G51, the discharge tube G51 is turned ON. The voltage signal is multiplied to tens of thousands of volt discharge start voltage by the transformer T51 and applied to the high voltage discharge lamp 60.

After tens of thousands of volt discharge start voltage is applied to the high voltage discharge lamp 60, this high voltage discharge lamp 60 is lighted and emits a brightness around the lamp.

After the high voltage discharge lamp 60 is lighted, the current signal output from the inverter 40 flows through an electric path comprising the coil L51, the transformer T51 and the high voltage discharge lamp 60 keeps the light on.

Tens of thousands of volt discharge start voltage is applied to the high voltage discharge lamp and the high voltage discharge lamp 60 is lighted in an instant. So the high voltage discharge lamp driving device according to the embodiment of the present invention can be used for an indoor high voltage discharge lamp driving device by turning it ON/OFF at any time.

Additionally, in a method for making the high voltage discharge lamp driving device, the discharge start voltage applied to the high voltage discharge lamp 60 can be lower than thousands of volts by changing the turns ratio of the transformer T51 of the light circuit block 50. In the case where the discharge start voltage applied to the high voltage discharge lamp 60 is lower than thousands of volts, the life of the high voltage discharge lamp 60 can be lengthened and the amount of the used power can be reduced.

Therefore, in accordance with the embodiment of the present invention, an outdoor high voltage discharge lamp without temporary lighting is driven by changing the turns ratio of the transformer T51 of the light circuit block 50.

According to the embodiment of the present invention, the high voltage discharge lamp driving device can be used for the outdoor high voltage discharge lamp driving device by reducing the discharge start voltage of the high voltage discharge lamp by changing the turns ratio of a last output coil. This invention also relates to the high voltage discharge lamp driving device which can light the high voltage discharge lamp in an instant by outputting over tens of thousands of volt discharge start voltage, and which can raise the efficiency of power by generating a high voltage pulses for driving the high voltage discharge lamp and by shortening the periods of high voltage pulse applied to the high voltage discharge lamp.

What is claimed is:

1. A high voltage discharge lamp driving device comprising:

a first power supply and a second power supply having a first DC voltage output and a second DC voltage output respectively for converting AC voltage to DC voltage, said second power supply comprising:
 a first transformer for isolating said AC voltage from the high voltage discharge lamp driving device,
 a first rectifier for rectifying an output signal of said first transformer,
 a first smoothing capacitor for smoothing an output signal of said first rectifier,
 a timer for outputting a pulse signal having a constant period,
 a switching means for chopping the output signal of said first rectifier in accordance with the pulse signal output of said timer,
 a second rectifier,
 a second transformer for coupling a chopped output of said switching means to the second rectifier, and
 a second smoothing capacitor for smoothing an output of the second rectifier for said second DC voltage output;

a gate driver means powered by said second DC voltage output for outputting a first and a second gate signal having the same phase, and outputting a third and a fourth gate signal having a reverse phase with the first and second gate signals;

an inverter for receiving the first DC voltage output and generating therefrom a positive pulse at a first output when said first and second gate signals are present at the inverter and generating a positive pulse at a second output when said third and fourth gate signals are present at the inverter; and a light circuit means for multiplying the first and second output from said inverter for igniting a discharge lamp whereby the time the high voltage pulses are applied to the lamp is shortened.

2. A high voltage discharge lamp driving device comprising:

a first power supply and a second power supply having a first DC voltage output and a second DC voltage output respectively for converting AC voltage to DC voltage;

a gate driver powered by said second DC voltage output comprising a means for generating a first and a second gate signal wherein the first and second gate signal have the same phase, and means for generating a third and fourth gate signal wherein the third and fourth gate signal have a reverse phase with the first and second gate signals, said means for generating the first and third gate signals comprising:
 a pulse width modulator comprising a pulse signal output having a high state and a low state,
 a photocoupler having an enabled state and disabled state responsive to said pulse signal output,
 a plurality of switching elements for outputting low level first and third gate signals when said photocoupler is disabled, wherein said switching elements are turned ON if said photocoupler is disabled and turned OFF if said photocoupler is enabled,
 a first and a third switching element for outputting high level first and third gate signals respectively when said photocoupler is enabled, wherein said first and third switching elements are turned ON if said photocoupler is enabled and turned OFF if said photocoupler is disabled, and
 a first zener diode and a third zener diode for overvoltage protection of the first gate signal and the third gate signal respectively;

an inverter for receiving the first DC voltage output and generating therefrom a positive pulse at a first output when said first and second gate signals are present at the inverter and generating a positive pulse at a second output when said third and fourth gate signals are present at the inverter; and a light circuit means for multiplying the first and second outputs from said inverter for igniting a discharge lamp whereby the time the high voltage pulses are applied to the lamp is shortened.

3. A high voltage discharge lamp driving device comprising:

a first power supply and a second power supply having a first DC voltage output and a second DC voltage output respectively for converting AC voltage to DC voltage;

a gate driver powered by said second DC voltage output comprising a means for generating a first and a second gate signal wherein the first and second gate signal have the same phase, and means for generating a third and fourth gate signal wherein the third and fourth gate signal have a reverse phase with the first and second gate signal, said means for generating the second and fourth gate signals comprising:
 a pulse width modulator comprising a pulse signal output having a high state and a low state,
 a plurality of switching elements for outputting low level second and fourth gate signals when said switching elements are turned ON, wherein said switching elements are turned OFF if said pulse signal output is low and turned ON if said pulse signal output is high, a second and a fourth switching element for outputting high level second and fourth gate signals respectively when said second and fourth switching elements are turned ON, wherein said switching elements are turned ON if said pulse signal output is low and turned OFF if said pulse signal output is high, and a second zener diode and a fourth zener diode for overvoltage protection of the second gate signal and the fourth gate signal respectively;

an inverter for receiving the first DC voltage output and generating therefrom a positive pulse at a first output when said first and second gate signals are present at the inverter and generating a positive pulse at a second output when said third and fourth gate signals are present at the inverter; and a light circuit means for multiplying the first and second output from said inverter for igniting a discharge lamp whereby the time the high voltage pulses are applied to the lamp is shortened.

* * * * *

UNITED STATES PATENT AND TRADEMARK OFFICE
CERTIFICATE OF CORRECTION

PATENT NO. : 5,563,475
DATED : October 8, 1996
INVENTOR(S) : Jeong-wham Yoon

It is certified that error appears in the above-indentified patent and that said Letters Patent is hereby corrected as shown below:

On the title page, ABSTRACT, line 3, after "device" delete "due".
Column 1, line 59, after "generating" delete "a".
Column 1, line 65, after "device" delete "due".
Column 9, line 28, after "generating" delete "a".

Signed and Sealed this

Twenty-second Day of July, 1997

Attest:

Attesting Officer

BRUCE LEHMAN

Commissioner of Patents and Trademarks